(12) United States Patent
Sadr-Salek

(10) Patent No.: US 6,417,934 B1
(45) Date of Patent: Jul. 9, 2002

(54) FACSIMILE TELECOMMUNICATIONS SYSTEM AND METHOD

(75) Inventor: Bahram Sadr-Salek, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/965,543

(22) Filed: Nov. 6, 1997

(51) Int. Cl.[7] ............................................... H04N 1/32
(52) U.S. Cl. ................................. 358/442; 379/100.01
(58) Field of Search ................................ 358/400, 402, 358/440, 442, 468, 443, 407; 379/100.01, 100.06, 100.09, 100.12

(56) References Cited

U.S. PATENT DOCUMENTS

| | | | |
|---|---|---|---|
| 4,900,902 A | * | 2/1990 | Sakakibara ................. 235/375 |
| 5,068,888 A | | 11/1991 | Scherk et al. |
| 5,136,634 A | | 8/1992 | Rae et al. |
| 5,291,302 A | * | 3/1994 | Gordon ...................... 358/407 |
| 5,459,584 A | | 10/1995 | Gordon et al. |
| 5,757,510 A | * | 5/1998 | Okada ........................ 358/402 |

* cited by examiner

Primary Examiner—Jerome Grant, II
(74) Attorney, Agent, or Firm—Edward H. Duffield

(57) ABSTRACT

A combined fax broadcast and fax-on-demand system having a number of facsimile enabled PC units connected to a server on a LAN network for storing fax documents. Each PC unit includes a fax card for performing telephony and fax functions on a channels connectable to respective telephone lines in a telephone network. Each one of the channels is configurable as an incoming or outgoing channel and the ratio of incoming and outgoing channels can be changed to reflect the number of fax broadcast documents scheduled for broadcast.

12 Claims, 10 Drawing Sheets

| | Broadcast Schedule 38 | |
|---|---|---|
| | Document | Subscriber |
| 1 | Doc 1 | Subscriber #1 |
| 2 | " | Subscriber #2 |
| 3 | " | Subscriber_List #1 |
| 4 | " | " " |
| 5 | " | " " |
| 6 | " | " " |
| 7 | Doc 1 | " " #n |
| 8 | | |
| 9 | Doc 2 | Subscriber #2 |
| 10 | " | " #3 |
| 11 | " | " #7 |
| 12 | " | Subscriber_List #2 |
| 13 | " | " " |
| 14 | " | " " |
| 15 | " | " " #m |
| 16 | | " |
| 17 | Doc 3 | " |
| | " | " |
| | " | " |
| | " | " |
| | " | " |
| Z | Doc x | " |

FIG. 3

| Subscriber Record | | |
|---|---|---|
| Subscriber Details | Fax Number | Account |
| John Smith | 012345678910 | 501-99 |
| " | " | " |
| " | " | " |
| " | " | " |
| " | " | " |

FIG. 4

| Network Line Status Table |||
| --- | --- | --- |
| Network Line | Configuration | Status |
| 1 | Fax Broadcast | Busy |
| 2 | | " |
| 3 | | " |
| 4 | | " |
| 5 | | " |
| 6 | | " |
| 7 | | Busy |
| 8 | | Idle |
| 9 | | " |
| 10 | | " |
| 11 | ↓ | " |
| 12 | ↑ | Idle |
| 13 | Fax-on-Demand | Busy |
| ↓ | ↓ | Idle |
| 17 | ↑ | " |
| 18 | Voice Mail | Busy |
| ↓ | | Idle |
| 24 | ↓ | " |

FIG. 5

FACSIMILE TELECOMMUNICATIONS SYSTEM AND METHOD

FIELD OF INVENTION

This invention relates to a facsimile telecommunication system and method and in particular to a combined fax broadcast, store and broadcast, fax-on-demand and voice-mail system.

BACKGROUND OF INVENTION

A noticeable trend for information service providers is a move away from producing large general information content and towards tailoring the content for a specific group of subscribers or a single subscriber. One area already benefiting from such content is that of electronic mail in which specific electronic content can be sent to very large numbers of users under automatic program control. More established technologies such as facsimile have been slow to develop tailored services mainly due to the resources and generally higher amount of manual interaction needed. For example, one facsimile machine taking two minutes to transmit a document could only service thirty subscribers an hour. To service a thousand clients within one quarter of an hour, as is needed for some financial information, over a hundred facsimile machines would be required, each machine needing a large amount of manual interaction. When a large number of different documents are available this problem is compounded.

Some facsimile broadcast solutions have gone some way to ease this problem. For example a fax broadcast solution using IBM's DirectTalk/2™ voice system comprises a personal computer having telephone network adapters and hardware for simulating a plurality of fax machines. Such a solution can allow forty eight subscribers to receive simultaneous transmission of dockets. However a single platform does not cater to bulk broadcasting services which can require over a hundred facsimile broadcasts simultaneously. At the present time the processing power of personal computers limits the number of fax card adapters that may be used on a single computer.

An additional problem with fax broadcast is that it relies upon the service provider for the information. This may be addressed by a store and broadcast function in which the facsimile machine is configured to receive and store a facsimile from a third party (a privileged subscriber) and then broadcast it to a list of subscribers. One example of store and broadcast is described in U.S. Pat. No. 5,459,584 which discloses a store and forward system associated with a plurality of subscriber fax machines. However it is a store and broadcast system only and does not address bulk broadcast.

With broadcast only solutions, the subscriber is reliant on the service provider or the privileged subscriber to include in the broadcast the information he requires. The information needs of the subscriber may be changing and additional or alternative information may be required. It would be useful if the subscriber could dial into the service provide and request a particular document to be sent to him Such a system is U.S. Pat. No. 5,136,634 which discloses a method for transmitting specifically requested graphic and/or textual data from an unattended database storage location to a requester's facsimile machine over a telephone line. It includes a host computer with a facsimile transmission board and a voice generation board. Multiple workstation nodes can be configured in a network setup to handle a high volume of calls in real time and to allow multiple data services to operate simultaneously. However this is a fax-on-demand system only and does not address broadcasting.

Another publication U.S. Pat. No. 5,068,888 discloses an information delivery system which automatically delivers documents from a central information storage location to a facsimile machine positioned at a remote location in response to user requests that are automatically answered by the system, The information delivery system includes an extended memory for digitally storing image files of documents. This publication there is no mention of bulk broadcast of fax documents.

Information service providers may also provide one way voice information services such as weather lines or cinema programs. More interactive services such as 'for sale' voice-mail boxes and personal voicemail boxes allow a subscriber to leave a voicemail message and for subsequent callers to listen and leave response messages for the subscriber.

One problem an information service provider faces if he wants to provide both fax bulk broadcast and voice services is that known systems are dedicated an separate requiring their own hardware and telephone lines. Integration of both facsimile and voice services would be useful as hardware resources and telephone lines could be shared. In addition to cost savings such an integration would be practical in terms of the telephone line usage efficiency. In the example of newspaper information providers facsimile usage is particularly heavy in the early morning when voicemail activity is low, such sharing of resources is therefore complementary.

It is an object of the present embodiment to provide a bulk fax broadcasting system that can also provide fax-on-demand, fax-store and forward and voice mail facilities.

SUMMARY OF INVENTION

One aspect of the invention is provided by claim 1.

This system provides a combined fax broadcast and fax-on-demand system not available in the prior art and provides an increased efficient use of external phone lines by configuration of the functions performed on the phone lines.

Preferably the main storage means is provided by a central computer attached to a network and each fax means is provided by a server computer attached to the network.

Each fax means is advantageously connected to local storage means for storing documents and fax information for transmission by or received from the fax means and means for copying a document and associated information from the central storage means to a local storage means are provided. In this way the risk of losing or corrupting data is reduced by eliminating the need to send document data over a remote connection in real time for immediate fax transmission.

In the preferred embodiment, the system may receive a fax document from an external subscriber on an incoming line and store it on its local data storage. The document may then be copied to the main data storage for use in fax broadcast or fax-on-demand. Such a feature allows greater choice of available documents so that subscribers are not limited to documents provided.

In the preferred embodiment, the system may initiate broadcast of a demanded document on the same channel as a received call. Such a feature is useful when a subscriber has a single telephone line with a combined fax and telephone. Such a broadcast will also save the information provider the cost of the phone call and mean lower prices for the subscriber.

In the preferred embodiment, the number of channels configured as broadcast channels is a function of the number of documents scheduled for broadcast. This allows the system to advantageously reconfigure itself to achieve the maximum use of the telephone lines.

A further aspect of the invention is provided by a fax broadcast and fax-on-demand system as claimed in claim 11.

A further aspect of the invention is provided by a method of ensuring communication integrity within a client server system as claimed in claim 10.

BRIEF DESCRIPTION OF DRAWINGS

In order to promote a fuller understanding of this and other aspects of the present invention, an embodiment will now be described, by way of example only, with reference to the accompanying drawings in which:

FIG. 3 is a representation of a broadcast schedule;

FIG. 4 is a representation of a subscriber record;

FIG. 5 is a representation of a channel status table;

FIGS. 8, 8A show the communication protocol steps performed the client;

DETAILED DESCRIPTION OF PREFERRED EMBODIMENT

Figure 1:
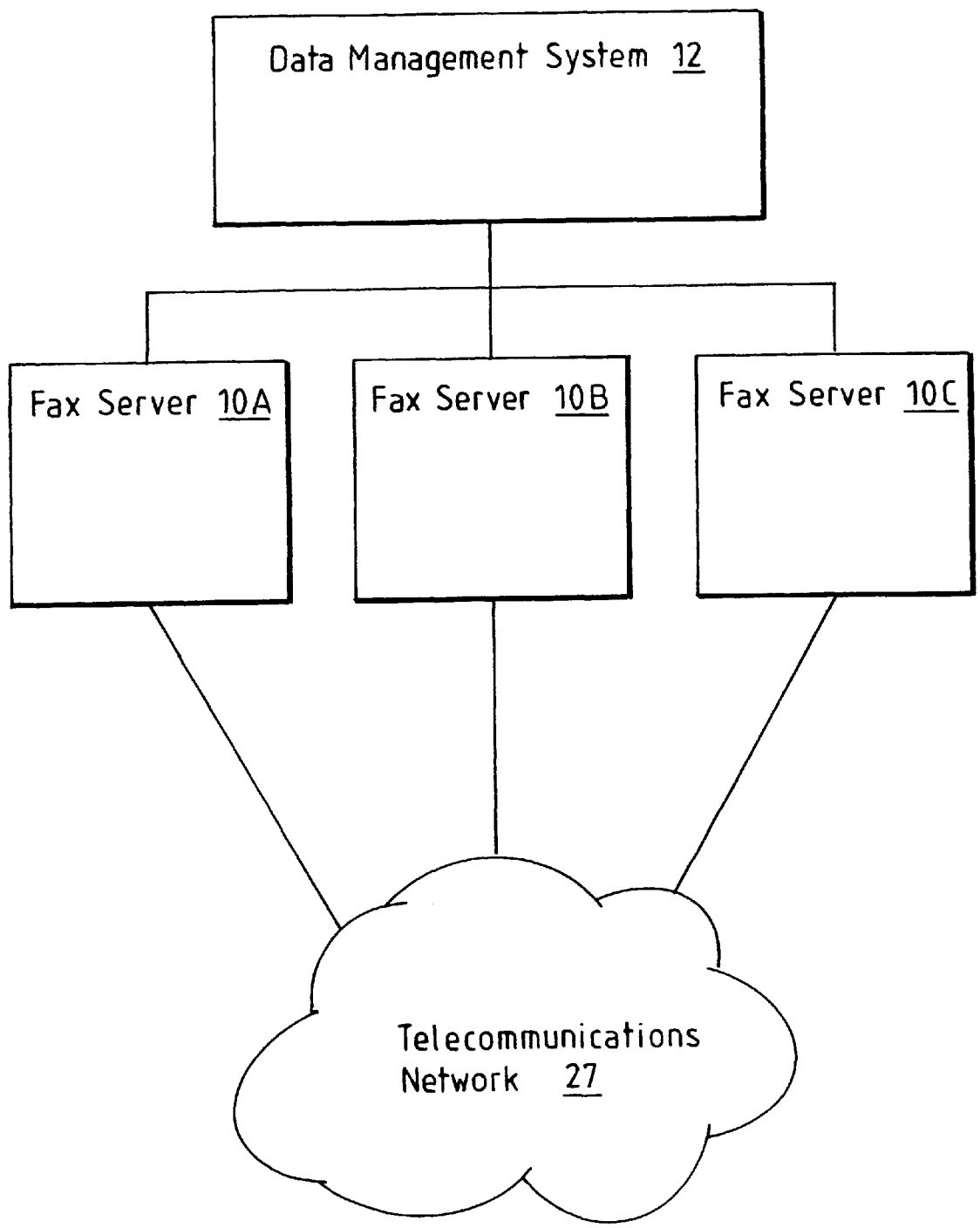
FIG. 1 is a schematic representation of the facsimile telecommunication system of the present embodiment.

The facsimile system comprises a data management server (DMS)12 connected to three facsimile servers (FS) 10A,B,C (see FIG. 1).

Figure 2A:
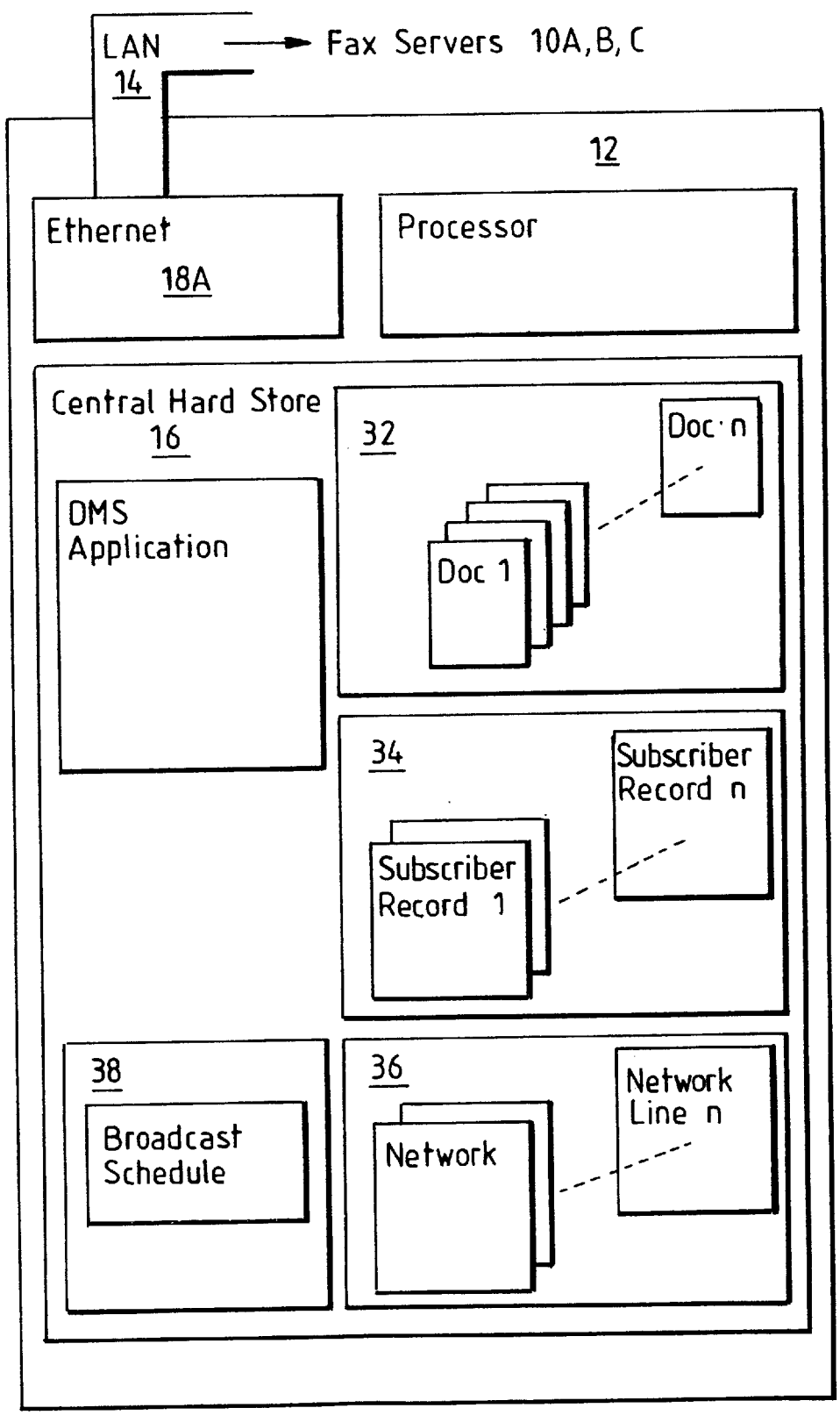
FIGS. 2A,B,C are schematic representations of the data management system, fax server 10A and fax server 10B with voice mail respectively of FIG. 1.
Figure 2B:
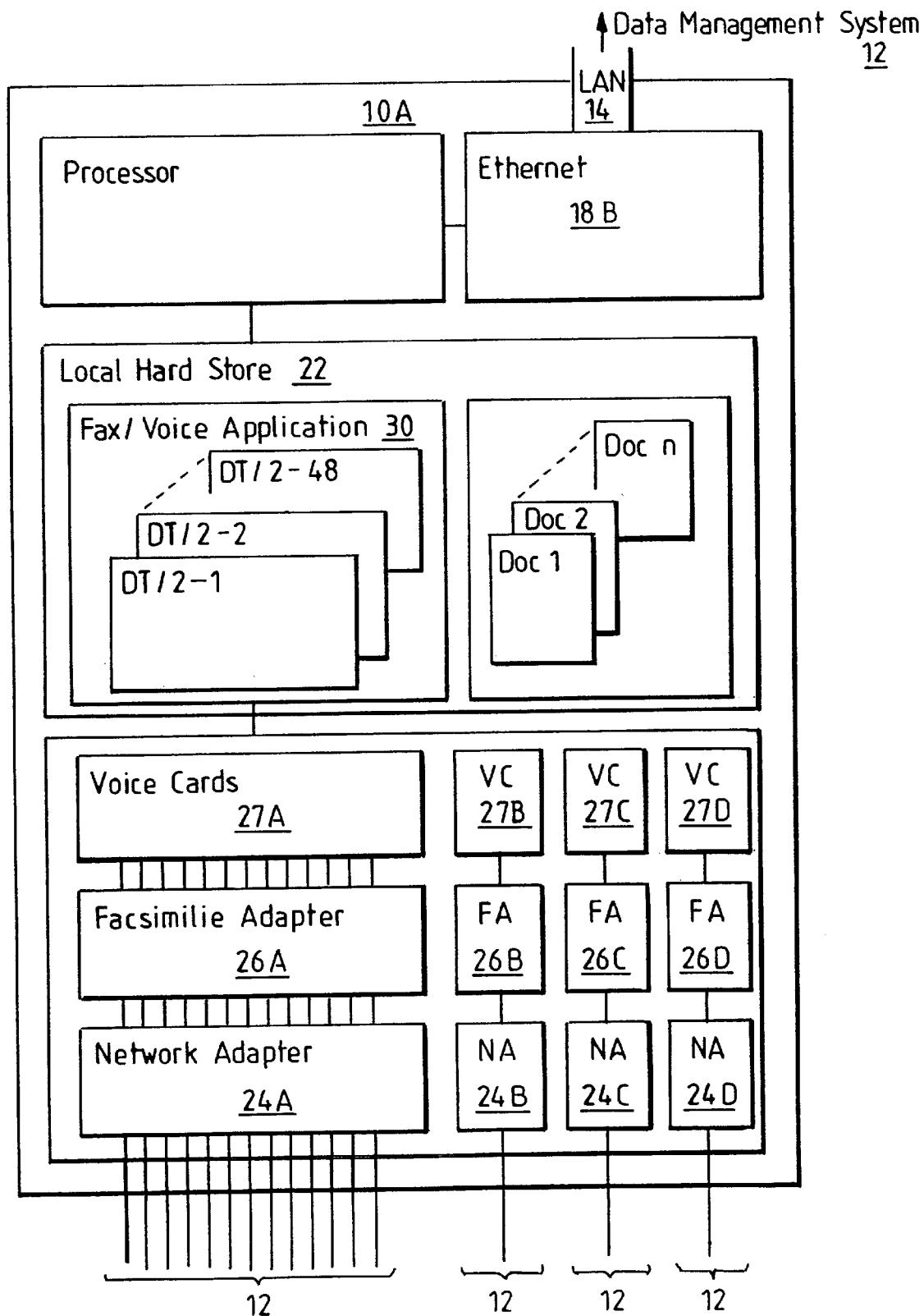
Figure 2C:
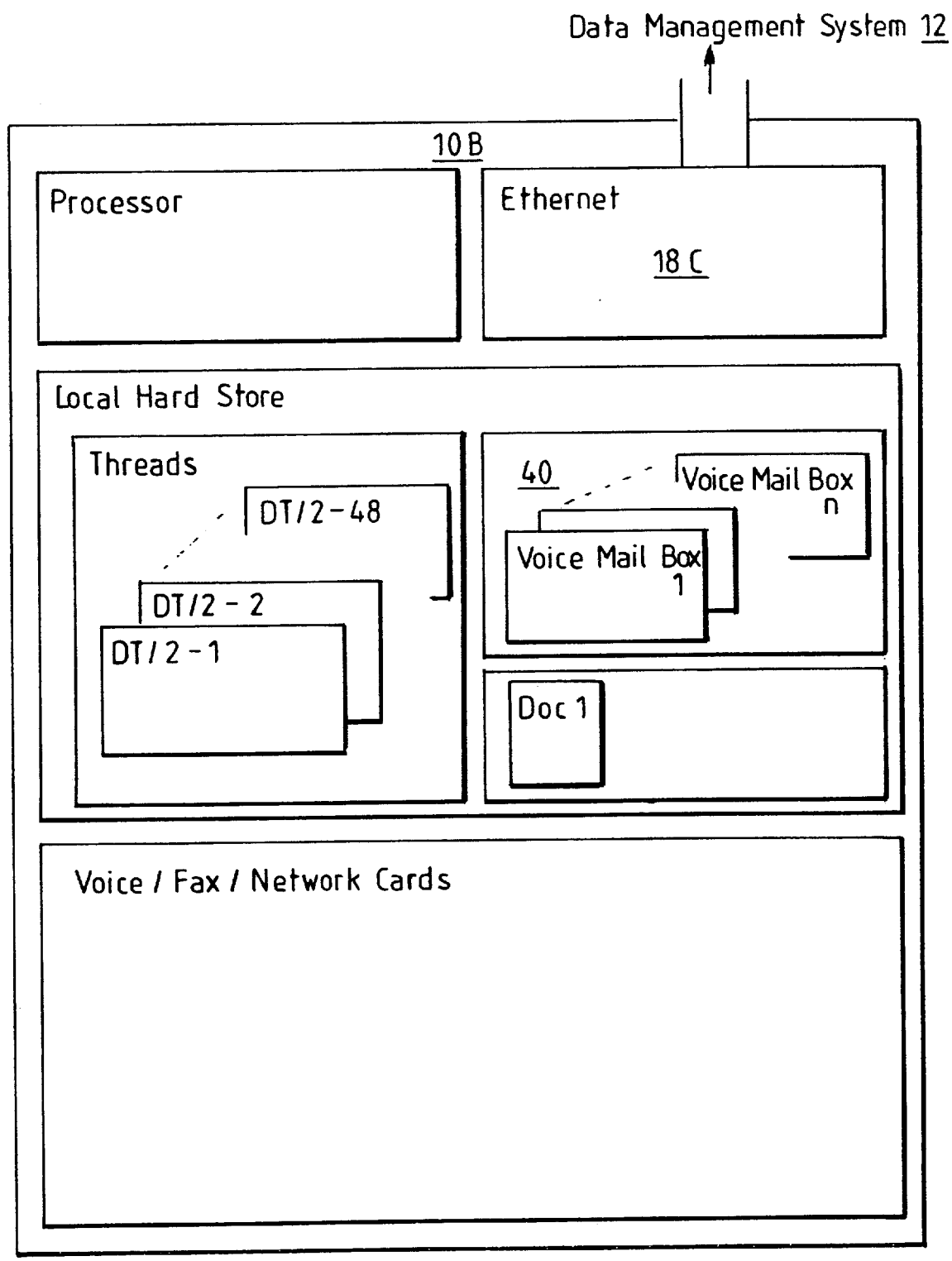

The DMS12 is, for example, an IBM RS6000 PC having an IBM RISC 6000 processor, 128 Mbytes of memory, a 10 Gbyte central hard drive 16, and an Ethernet card 18 connecting with a LAN 14. The DMS12 is under the control of AIX for RISC/6000 operating system and a data management application (see FIG. 2A).

Each FS 10A,B,C is a pentium based processor 20 connected by a microprocessor bus to 64 Mbytes of RAM, a 2 Gbyte local hard drive 22 and an Ethernet card 18B,C,D for connection to the LAN 14. Connected to the microprocessor bus are: four twelve line network adapter cards 24A,B,C,D giving the FS 10 forty eight possible network lines 25 to the telecommunications network 27, four twelve line facsimile adapters 26A,B,C,D for performing facsimile operations on the network lines; and four twelve line Voice cards 28A,B,C,D for performing voice functions on the network lines. The cards and adapters 24, 26, 28 are packaged in a commercial expansion chassis attached to the PC. Corresponding cards are grouped in sets and interconnected by a dedicated bus separate from the micro processor bus for intercommunication i.e. one network adaptor 24, facsimile card 26 and voice card 28 are grouped and interconnected. Each FS 10 runs under a fax and voice application such as DirectTalk/2 on an OS/2 operating system (see FIGS. 2A and B).

The transmission of the faxes is performed by the FS 10A,B,C under the control of the DMS12. The DMS12 controls which fax documents are used, destinations, line traffic—delegating which network lines handle the which type of fax service or voice service, load balancing—determining how many lines are used for the services, and prioritising which documents are to be sent first and which last. Requests, messages and data are transmitted between DMS12 and the FSs 10A,B,C over the LAN 14 using TCP/IP protocol and a proprietary protocol described below.

DMS SOFTWARE

The DMS software is adapted to control each of the network line on each of the FS 10, in the present example this amounts to 144 lines. The DMS software is responsible for 1) maintaining a fax document database 32 of all the broadcast documents required by the subscribers.

2) maintaining a subscriber database 34 of subscriber details including fax number, document/s required and billing information.

3) designating each of the network lines on each of the FS to be incoming for broadcast mode or out going for fax-on-demand mode, fax, store and forward mode or voicemail mode and maintaining network line control files 36 to record the mode of the network lines.

4) monitoring the status of each network line and recording the status in the network line database 36.

5) maintaining a schedule of documents for broadcast 38 including their fax number destinations.

6) controlling the downloading of a fax document from the fax document database 32 to a FS 10 prior to a fax transmission 7) requesting an FS 10 to transmit a fax document on a network line which is idle.

8) requesting that fax documents which have been transmitted and are no longer required be deleted from a FS hard drive 22.

9) maintaining and updating subscriber billing information.

10) maintaining, verifying and changing ID and PIN numbers.

CONTROL FILES

The DMS12 stores a control file 36 for each network line connected to the FS 10A,B,C. The control files use 7 application specific variables:

ACK_server_port "6801"

FOD_server_port "6001"

FAX_recv_path "C:\FS\SF\"

FB_path "C:\FS\"

FOD_path "C:\FS\FOD\"

dt2_machine "1"

machine_addr "206.103.12.30"

ACK_server_port is set to a constant (eg. 6801) and is used by all network lines to send the status of the transmitted fax. The transaction 'I_Am_Here' also is sent to this port.

FOD_server_port has a different value depending on the voice line and hence unique control files. This variable is used to store the port number that is used for issuing transactions to DMS12. Each network line communicates with a separate port on DM12, so if there are forty eight lines configured for FOD, the corresponding ports on RS6000 are numbered 6001–6048. The required number of network lines for FOD are divided among the 3 DT2 machines. For example, 14 lines each on machine 1 and 2, and 20 lines on machine 3. The FOD port numbering for machine 1 is 6001 to 6014 for network lines 1 to 14. For machine 2 of the FOD ports are set to 6015 to 6028 for network lines 1 to 14 and for machine 3 the FOD ports are set to 6029 to 6048 for network lines 1 to 20.

FAX_recv_path is the path for receiving incoming fax documents. It is set to 'C:\FS\SF' and is mounted as an NFS drive on the DM12.

FB_path is the path for broadcast fax documents to be copied into. It is set to 'C:\FS\' and is mounted as an NFS drive on DMS12.

FOD_ path is the path for 'one call' FOD fax documents to be copied into. It is set to 'C:\FS\FOD\' and is mounted as an NFS drive on the DMS.

dt2_machine is set to 1 for the first FS (10A) and set to 2 for the second FS (10B) and set to 3 for the third FS (10C). The DMS12 needs to know which machine the transaction is coming from, therefore every transaction sends the value of this parameter.

machine_addr is a variable that contains the IP address of the DM12 machine; for example, '206.103.12.30'.

FS SOFTWARE

The fax/voice application 30 running on an FS 10 is adapted to perform the functions for each of the network lines in parallel by running forty eight instances of facsimile simulations or separate voice application threads at the same time. The threads are numbered DT2-1 to DT2-18 in FIG. 1. Included in the FS software functions are:

1) accepting fax document data (a document eg xxxxx) from DMS12 and storing data on the local hard drive 22;
2) accepting requests from DMS12 to perform a fax transmission if data stored on the local hard drive 22;
3) transmitting a document through a fax card line onto a network line as a result of a request from the DMS12;
4) notifying DMS12 when a document has been transmitted successfully;
5) notifying the DMS12 when a document transmission has failed and notifying the reason for failure (Send-Fax-Status);
6) notifying the DMS when a fax card line is free to perform a fax operation;
7) running Interactive Voice Recognition (IVR) applications including:
   i) playing a message through the voice card requesting account and PIN data from a caller;
   ii) accepting DTMF tones from the caller as input data;
   iii) passing PIN data to the DMS for verification (Verify-Pin);
   iv) passing PIN data to the DMS for PIN changes (Change-Pin);
   v) playing a message informing the caller of the results of the verification or change;
   vi) passing fax number change request to DMS (Change-Fax);
   vii) playing a message requesting fax document data from caller;
   ix) passing received document to DMS for storage;
   x) requesting transmission of stored document; and
   xi) receiving a fax from a caller (Receive_Fax).
8) monitoring network lines designated as fax-on-demand for incoming calls.

FAX SUB-APPLICATION

The fax/voice application 30 comprises 4 fax/voice sub-application FAX, FAXB, FAXOD and FAXSV. The FAX application is the startup application and this is where all the variables are created and initialised. This application sends an 'I_Am_Here' message (heartbeat signal) to the DMS to indicate that the line is available. On a positive acknowledgement from DMS the FAX sub-application will link to the FAXB (fax broadcast) sub-application. If however, the connection fails or no acknowledgement is received within the time specified in the 'timeout' variable, the processing pauses in this sub-application and periodically issues the 'I_Am_Here' transaction until it receives a positive response from the DMS12. If any calls arrive in the meantime, the caller is told 'the service is not available'. This is explained in greater detail in a separate section on the Heartbeat/Acknowledgement protocol.

Following is the list and definition of the global variables defined in FAX application:

port_number this the TCP/IP port that is required by some of the actions above to communicate with the DMS. The variable is either set to 'ACK_server_port' or 'FOD_server_port' depending on whether the FS is communicating with an acknowledgement server or an FOD server on DMS;

host_ok this variable is used as a flag to indicate whether a DMS host is available or not. The value '0' indicates that the DMS host is available, and value '1' indicates that the DMS host is unavailable. timeout this variable is used for the amount of time an action should wait for a response from the DMS. The value of this parameter is set to '10' seconds.

error_trace this variable is used to store the application name, application status and return code of where an action generated step and return code of where an action generated the 'Error' return code. It's value will be logged in the application log file.

max_error this variable is the maximum number of errors that a user is allowed to make. This variable is initialised to '3' upon start of the application.

store_forward this variable is used to indicate whether the caller is authorised for 'fax store and forward' option or not. The initial value of this variable is set to '0' indicating the caller is NOT authorised.

id this variable is used to store the caller's ID.

pin this variable is used to store the caller's password.

FAXB Sub-application

FAXB sub-application is used to broadcast fax documents. This application is also used for transmitting 'two call fax' requests: The application issues a 'What Mode' transaction and all the required variables like 'fax_documents1', 'fax_number' and 'subscriber' are set with the values sent by DMS12 in the broadcast command. If 'fax_documental' has a value of '00000000.000', then it means that no action should be taken. This value used to change the voice line mode from FOD to broadcast without actually transmitting any faxes. The structure related to 'Send_Fax_Status' has capability of sending status on multiple documents and that's why the parameters are ended with a number to indicate the status for that particular document (status1, reason1, fax duration1l) etc. If 'Send_Fax_Status' fails for any reason, then the application will continue sending it until it is received by the DMS.

FAXOD Sub-application

This sub-application deals with FAX on Demand. Since every call needs to access the DMS, the sub-application sends an 'Are_You_There' signal (heartbeat signal) to check the status of the host. A flag (host_ok) is set to '0' DMS sends back a positive ACK, otherwise the flag is set to '1'. If the DMS was up for the duration of the call but became unavailable just before the status was sent, then the application records this is a variable called 'ACK pending' by setting its value to '1'. While this flag is set to '1', the application transmits the status on a regular basis until it is acknowledged by the DMS. The application then resets the 'host_ok' flag. and the 'ACK_pending' to '0'. In every section that the caller's input is required, the caller is allowed to make up to 3 mistakes. This is tracked by the variable 'error count' and checked against the global variable 'max error'. If the option 'balance' is selected; the application requests a document with document id set to 00000001.

FAXSV Sub-application

This sub-application enables callers with services like 'change_PIN' 'change_FAX' number, 'Stop_Service' and 'Resume_Service'.

FS Functions

I_Am_Here. This action is used to indicate to DMS that the line is available. This action takes no parameter from the action panel but it requires the following variables be available in the global pool: machine_addr; port_number; timeout; voice_line; dt2_machine.

The action returns the following return codes: EDGE0=OK; EDGE1=Timed Out; EDGE2=Connection Failed; EDGE3=Not Ready; EDGE4=Error.

Verify_PIN. This action verifies a caller. It takes two parameters from the action panel: User_ID and PIN. It also requires the following variables be available in the global pool: machine_addr; port_number; timeout; voice_line; dt2_-machine. The action returns the following return codes: EDGE0=OK; EDGE1=Timeout: EDGE2=Connection Failed; EDGE3=Userid Invalid; EDGE4=PI2V Invalid; EDGES=OK (Store & Forward); EDGE6=General RS6000 Error; EDGE7=Error.

Change PIN. This action is used for changing a caller's PIN number. It takes 3 parameters from the action panel: User_ID, Current_PIN and New_Pin. It also requires the following variables be available in the global pool: machine_addr; port_number; timeout; voice_line; dt2_machine.

The action returns the following return codes: EDGE0=OK; EDGE1=Timeout; EDGE2=Connection Failed; EDGE3=Unable to Change PIN; EDGE4=Error.

Change FAX. This action allows callers to change one of their fax numbers. The action takes 3 parameters from the action panel: User_ID; FAX_Number and FAX_Line. It also requires the following variables be available in the global pool: machine_addr; port_number; timeout; voice_line and dt2_machine. The action returns the following return codes: EDGE0=OK; EDGE1=Timeout; EDGE2=Connection Failed; EDGE3=Unable to Change Fax #; and EDGE4=Error.

Request FAX. This action requests a document(s) from the DMS for both 'one call' and 'two call' fax. The caller can 'specify a fax number other than the default number for receiving the documents. This action takes 4 parameters from the action panel: User_ID; Fax Line (0=default, 1=new); Fax_Type and Number_of_Documents. It also requires the following variables be available in the global pool:

machine_addr; port_number; timeout; voice_line; dt2_machine; fax_document%d where '%d' is 1-nn and new_fax_number.

In case of multiple document request, each document id will be read from 'fax_document1', 'fax_document2' and so on. This action sets up the following variables: fax_type (one-call or two-call); documents (number of documents); fax_document%d where'%d' is 1-nn. The action returns the following return codes: EDGE0=OK; EDGE1=Timeout; EDGE2=Connection Failed; EDGE3=Insufficient Fund; EDGE4=Subscription Has Expired; EDGES=Access Denied; EDGE6=Document Not Ready; EDGE7=General RS5000 Error and EDGE8=Error.

Send_Fax_Status. This action sends the status of the transmitted fax to the DMS. The action takes one parameter from the action pane: Number of Documents. It also requires the following variables be available in the global pool:

machine_addr; port_number; timeout; voice_line; dt2_machine;

status%d where %d=1-n (n=number of documents);

reason%d where %d=1-n (n=number of documents);

duration%d where %d=1-n (n=number of documents); and pages_sent%d where %d=1-n (n=number of documents).

This action returns the following return codes: EDGE0=OK; EDGE1=Timeout; EDGE2=Connection Failed; and EDGE3=Error.

Get Doc Variable. This action take 3 parameters from the action panel: FAX Document; Name FAX Document Suffix; and Value. It concatenates the first two to build a new variable name, then it returns the value of that variable into the 3rd parameter. For example if parameter 1 contains 'fax_document' and parameter 2 contains value '1' and parameter 3 is called result, then this action returns the content of variable 'fax_documental' into variable result. This action returns the following return codes: EDGE0=OK; EDGE1=Error Put_Doc_Variable. This action is the reverse of the 'Get_Doc_Variable', it returns the content of parameter 3 into the new variable concatenated for parameter and parameters2. The three parameters from the action panel are: FAX Document Name; FAX Document Suffix; and Value. This action returns the following return codes: EDGE0=OK; and EDGE1=Error.

Stop_Service. This action stops the daily fax broadcast service for a particular user until a 'Resume_Service' action is executed. This action takes one. parameter only: User_ID. It also requires the following variables be available in the global pool: machine_addr; port_number; timeout; voice_line; and dt2_machine. This action return the following return codes: EDGE0=OK; EDGE1=Timeout; EDGE2=Connection Failed; EDGE3=Unable to Stop; and EDGE4=Error.

Resume_Service. This action resumes a daily broadcast service that was previously stopped by a 'Stop_Service' action. It takes only one parameter from the action panel: User_ID. In also requires the following variables be available in the global pool: machine_addr; port number; timeout; voice_line and dt2_machine. This action returns the following return codes: EDGE0=OK; EDGE1=Timeout; EDGE2=Connection Failed; EDGE3=Unable to Resume; and EDGE4=Error.

Validate_Group. This action validates that a caller has entered a group id that belongs to him. This action takes 2 parameters from the action panel: User_ID and Group ID. It also requires the following variables be available in the global pool: machine_addr; port_number; timeout; voice_line; and dt2_machine. The action returns the following return codes: EDGE0=OK; EDGE1=Timeout; EDGE2=Connection Failed; EDGE3=Group Id Invalid; EDGE4=Caller Not Authorised; EDGES=Insufficient Fund; and EDGE6=General DMS Error; and EDGE7=Error. Doc_

Received. This action is used to notify the DMS about a fax document that it received from a caller. It takes 4 parameters from the action panel: User_ID; Group_ID; Document_Name; and Number_Of_Pages.

It also requires the following variables be available in the global pool: machine_addr; port_number; timeout; voice_line; and dt2_machine.

This action returns the following return codes: EDGE0=OK; EDGE1=Timeout; EDGE2=Connection Failed; EDGE3= Group Id Invalid; EDGE4=Caller Not Authorised; EDGE5= Document (Files) Error; EDGE6=General DMS Error; and EDGE7=Error.

Are_You_There. This action is used to find out whether the DMS host is available or not. It takes no parameters from the action panel but it requires the following variables be available in the global pool: machine_addr; port_number; timeout; voice_line; and dt2_machine.

The action returns the following return codes: EDGE0=OK; EDGE1=Timed Out; EDGE2=Connection Failed; EDGE3= Not Ready; and EDGE4=Error. What Mode. This action is used to communicate with 'FAXSERV' server to find out what mode the voice line should be set. This action takes 2 parameters from the action panel: GSI Name and Time Out (the general server interface is the main server interface). It also requires the following variable be available in the global pool: voice_line. Upon completion of this action if the return code is returned as 'Fax Broadcast' then the following parameters are set: fax_document%d where %d 1-nn; documents (number of documents received); fax_number; and subscriber. The action returns the following return codes: EDGE0=Fax Broadcast; EDGE1=FAX On Demand; EDGE2=Voice Mail; EDGE3=Time Out; and EDGE4=Error. Send_Fax. This action is used to transmit a fax_document. The 1st parameter defines the file name to be used. If this file contains the list of files that to be transmitted then the 2nd parameter must be set to 'L' for list. If the 1st parameter is the actual file to be transmitted then the second parameter must be set to 'D' for document. The 3rd and the final parameter is the name of the subscriber to be placed in the header line of each fax sheet. The three parameters from the action panel are: File_Name; File Type (List or Document); and Subscriber_Name. The action requires the following variable be available in the global pool: voice line. The action returns the following return codes: EDGE0=OK; EDGE1=File Not Found; EDGE2=Fax Board Error; and EDGE3=Error. The Fax Board Error is any errors caused while transmitting other than those errors relating to the fax file.

Receive_Fax. This action is used for receiving fax document from the caller. The action takes two parameters from the action panel: File_Name (this is an output parameter) and Number_of_Pages (this is an output parameter). It requires the following variable be available in the global pool: voice line. Upon completion, this action returns the number of pages received in a variable called 'pages'. This action returns the following return codes: EDGE0=OK; EDGE1=Fax Board Error; and EDGE2=Error.

BULK FAX BROADCAST MODE.

An overview of the operation of the facsimile system by a business information provider is as follows. Financial articles will have been prepared and documents edited during the previous evening for the morning's financial news. For instance, a fax document is prepared by a journalist on a computer connected to the LAN 14 and copied to the DMS12, the document concerns a particular financial topic and is saved on the DMS12 under a document reference number for that topic such as Doc 1. Other financial topics have their own document reference numbers. Normally all the broadcast documents have been updated by a deadline and the DMS system designates the majority of network lines 25 for broadcast mode by updating the network line status table (see FIG. 5). Each network line 25 should then be in broadcast mode and no incoming calls on those lines will be answered.

Figure 6:
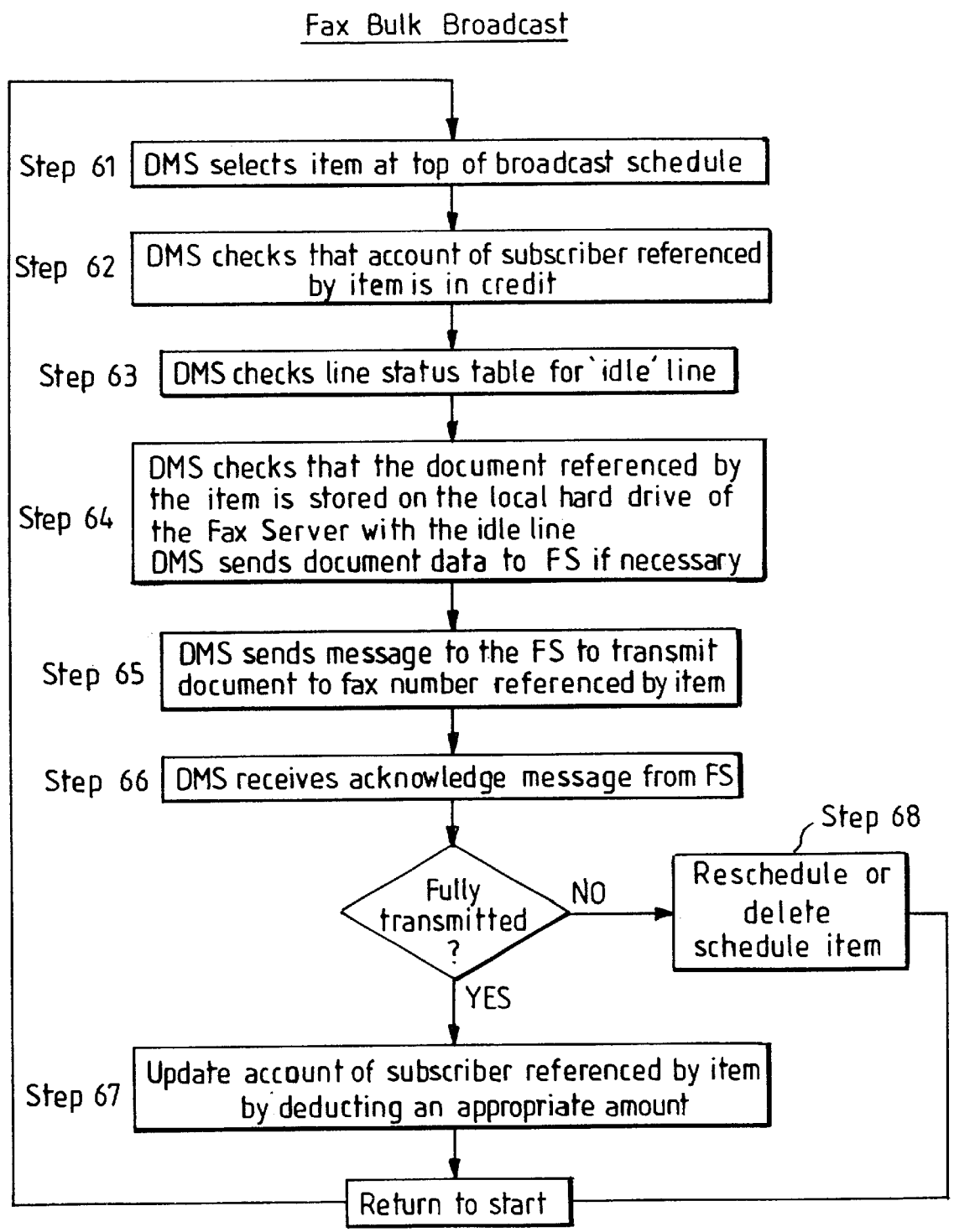
FIG. 6 shows the steps in a bulk fax broadcast.

The DMS12 constructs a broadcast schedule 38 for doc. 1 (see FIG. 3) by checking through the subscriber database 34 and where a subscriber requires Doc. 1 adding a reference to Doc 1. and the subscriber's fax number to the broadcast schedule 38. The DMS12 does this for each of the documents. Alternatively or additionally a list of subscribers who wish to receive a particular document can be stored and referenced by the broadcast schedule. FIG. 6 depicts the process steps of a bluk fax broadcast thread. The DMS selects the first subscriber on the broadcast schedule 38 +step 61 and checks that the subscriber is in credit from the subscriber records (FIG. 4). The DMS then checks the network lines status table for an 'idle' line and associated FS +step 63. The DMS then sends Doc 1 to the FS 10A by copying the data file using Network File System protocol which stores it on the local hard drive 22A step 64. If the document is already stored on the local hard drive then non transfer takes place. For the first idle network line, the DMS12 sends an instruction to the FS to send Doc 1 to the first subscriber fax number on the subscriber list for doc1 using the first idle network line 25 step 65. The FS 10A receives the instruction and processes it in the thread associated with the first idle network line 25. The FS 10 under the control of the thread then proceeds to instruct the fax adaptor 26 to transmit Doc 1. At the same time the DMS12 sends an instruction to the FS 10A to send Doc 1 to the second subscriber fax number on the broadcast schedule 38 and so on until there are no more subscriber fax numbers on the list or there are no more idle network lines. If there are no more idle network lines the DMS may wait until a network line becomes idle before requesting the FS 10A to send Doc 1 to the next subscriber number on the list. Alternatively the DMS sends Doc. 1 to FS 10B and requests that FS 10B sends Doc 1 to the next subscriber fax number of the schedule using the first idle network line on FS 10B.

When a Doc 1 has been sen to the first subscriber the FS sends an acknowledgement message step 66, to the DMS including the status of the transmission. If the document was fully transmitted then the subscriber account is debited step 67. If not fully transmitted the document is resccheduled for later broadcast and the subscriber account is not debited step 68. The original first idle network line becomes idle after this and the FS 10A updates the DMS of this. On receipt of the idle message the DMS 12 requests FS 10A to send the Doc 1 to the next subscriber fax number on the schedule. Once all the fax numbers for Doc 1 have been sent the DMS 12 may start to broadcast the next document on the schedule 38.

The above operation, in which the documents are processed in order is only one way in which documents may be scheduled to be broadcast. Another way is for documents to be processed in parallel with dedicated network lines, each document being broadcast on a particular line or for subscribers to be processed in series or parallel.

If more than one subscriber requires the same document, the data for that document is only sent to and stored on the transmitting FS 10 once in order to save resource time and capacity. Storing the document data on local hard drive 22 rather than central hard drive 16 avoids read time transmission problems over the network were the documents sent directly from the DMS 12. In broadcast mode, all communication between DMS 12 and FS 10 will be done by the DMS 12 sending requests and data to a Server in the FS system. The FS 10 will initialise itself at Reset or Power-on to fax-on-demand (FOD) mode. When DMS 12 requires a fax broadcast it will send a command to FS10 requesting broadcast. Once FS10 has attempted to send the fax it will then report back to DMS 12 whether it was successful or not. FS 10 dispatches the successful requests to DT2 application lines and then waits for the next command from DMS (to broadcast again, or to go into fax-on-demand mode).

Before broadcasting faxes, the DMS will download all the required fax documents (Doc 1 or Doc3) to the FS local hard drive 22 by Network File System (NFS) or File Transfer Protocol (FTP).

The data structure associated with each request that contains the following data:

```
typedef struct_INFO
{
  int iRequestType;
  int iLineNumber;
  char szPhoneNumber[MAX_PHONE_NUM_LENGTH+1];
  char szSubscriberName[MAX_NAME_LENGTH+1];
  int iNumDocuments;
  char szDocumentName[MAX_NUM_DOCS][MAX_DOC_NAME_LENGTH];
} INFO;
``` where:

iRequestType is the request type i.e. broadcast, FOD or voice mail_ iLineNumber is the network line number (1–48)

szPhoneNumber is the fax number to be dialed iNumDocuments is the number of fax document to be sent szDocumentName is the list of the documents names to be sent szSubscriberName is the name of the subscriber.

Each request to the FS 10 is acknowledged synchronously and an appropriate return code is returned. The possible return codes are: REPLY_OK; REPLY_INVALID_LENGTH; REPLY_INVALID_TYPE; REPLY_INVALID_LINE; and REPLY_INVALID_NUMDOCS.

The purpose of this acknowledgement is to tell DMS that its request has arrived and it is being dealt with.

When the DMS wishes to broadcast a set of faxes, it must first download all the fax documents to the FS 10A,B,C systems. DMS 12 must also maintain a list of fax numbers and fax documents and handle the broadcast by sending a series of individual requests to each fax line in the FS systems. For example, requests to broadcast documents such as:

'Broadcast Fax_Document#1 to Subscriber_List#1'

'Broadcast Fax Document#2 to Subscriber_List#2' which make up the broadcast schedule must be broken down by the DMS into:

'Send Fax Document#1 to Fax_Phone#1 on Fax Line#1,

'Send Fax Document#1 to Fax_Phone_#2 on Fax Line_#2,

'Send Fax_Document#1 to Fax_Phone_#3 on Fax_Line#3,

.. .. .. ..

'Send Fax_Document#2 to Fax_Phone_#201 on Fax_Line#82

'Send Fax_Document#2 to Fax Phone_#202 on Fax_Line#83

.. .. .. ..

etc. . . .

After each transmission the appropriate fax application will send an acknowledgment to report the status of the transmission. The acknowledgement has a data structure of:

```
typedef struct_ACK_FAX_STATUS
{
  char szLineNumber [3];
  /* "01"–"48" null terminated.
  */
  char chStatus;
    /* '0' = OK    '1' = Failed.
    */
  char chReason;
    /* Reason for failure.
    */
} ACK FAX STATUS;
``` where:

szLineNumber is the network line number that attempted the transmission.

chStatus is result of the transmission (successful or failure)

chReason reason will specify why th.e fax was not completed eg. phone busy, not a fax number.

Line usage, load balancing, retries, etc must all be controlled by the DMS.

FAX STORE AND BROADCAST

One or more network lines 25 may be designated to receive incoming calls for FOD, fax store and broadcast (described below) or voice mail. Privileged subscribers are those who may dial into the fax system and send a document for storage and subsequent broadcast. For example a privileged subscriber dials the number of the fax store and broadcast service and is connected by a PBX to a specific network line dealing with this service. A voice card 27 on a FS 10 greets the privileged subscriber by playing a message asking for identification, PIN number and document reference. This is sent to the voice card as DTMF tones by pressing the keypad, this is sent to the DMS for verification. Once verified the document transmission may commence and is received on the network line into the local FS hard drive 22. Once complete the document is sent from the local FS hard drive over the LAN 14 to the DMS12 and stored with respect to the document reference supplied. Broadcast of the received document may take place with the bulk broadcast of documents or at some other time or immediately, the FS 10 may ask the subscriber which service is required or such information may already be on the privileged subscriber's records as stored as the DMS 12.

FAX-ON-DEMAND

Bulk broadcast of the subscriber documents would normally be performed during one or two specific periods in the day, in the example of business information, typically in the early morning. This means that the network lines configured for broadcast used in the bulk broadcast may be under-utilised later on in the day. For this reason the DMS 12 re-designates the network lines to accept incoming calls for other fax services including the presently described fax-on-demand service. Callers are required to be subscribers to the fax system and have subscription details saved on the DMS 12 as records 34. The operation is similar in some ways to that of the fax store and broadcast. The voice application on a FS 10 greets the caller and asks for identification, PIN number and document reference. The caller sends DTMF tones along the network line by pressing his keypad in response to the request and the signals are sent to the DMS for verification. The voice application further asks the caller if one or two call fax-on-demand is required. One call fax back is preferred when the caller has a combined telephone/fax, transmission of the fax is immediate from the fax system if the verification is positive and the caller's equipment is reconfigured to receive the fax. Two call fax back is used when the caller wishes the fax system to call a particular fax number, stored in the subscriber record 34 or requested by the voice card. The two call fax back may be immediate, in a non-peak period or at the bulk broadcast time.

VOICE MAIL

Voicemail in the present embodiment of a business information provider uses less network lines than the fax bulk broadcast service. At any time the number of network lines engaged in providing a particular voice service is comparable to those needed for just the fax-on-demand service and such a service may be provided on just a single server. Voicemail boxes 40 may be provided for on a single fax server or shared by other fax servers, for either option interaction with each other or a central storage location is minimal and they can operate substantially independently. Voice mail services may not be required at the same time as bulk fax services and therefore the network lines allocated for voice mail services may be configured for use as fax lines at peak fax times and reconfigured for voice mail after. The DMS 12 designates all the network lines for fax broadcast when necessary but when the demand for broadcast is low some network lines are designated for use with voice mail.

An entry in the network line status table (FIG. 5) will desginate a network line as an incoming/voice mail line. An incoming call listener will listen for an incoming call on this line and then start a voicemail thread to process such a call when received. For instance 12 network lines may be required for voicemail and these 12 network lines are attributed to one FS 10B which runs the voicemail software. Voicemail boxes 40 which contain the voice messages are held in the FS local hard drive 22 although they could also be kept on the DMS central hard drive 16. This is because only one FS will access the voicemail box and there is no need to store the voicemail box in the DMS central hard drive 16. To do so would be possible with extra messaging between the FS 10B and the DMS12. However in this embodiment the only signalling that is required between the DMS 12 and the FS 10B is the configuration of the voicemail network lines.

The information provider or a privileged subscriber will normally provide the voice recording. If the latter then the service must be recorded externally. The privileged subscriber rings the allocated number and is connected to a voicemail configured network line by the PBX. A message is played using the voice card 28 which asks for the subscribers identification and PIN number. Identification and PIN are entered using DTMF tones and verified by the FS 10B, if okay several messages detailing the options available to the privileged subscriber are played over the line by the voicecard under the control of the voicemail software. The subscriber at this point chooses to record a message and speaking over the line and recording the message which is stored by the FS 10B in its local hard drive 22.

A caller wishing to use the voice service rings another allocated number and is connected to a voicemail configured network line. The voicemail application identifies the voicemail box either by the dialed number or by enquiring from the caller and plays the voicemail to the caller. The caller will then be given various options including that of recording a reply to the voicemail message and hearing the message again. Any recording will be stored on the FS local storage for the voicemail box owner to listen to.

The privileged subscriber can ring the subscriber number and choose the option to listen to the replies to his original message. An example of this service would be a 'for sale' voicemail service in which the subscriber may describe the object he is selling including the price in his original message and whereby interested parties leave replies making offers on the object. Another example are lonely heart type messages in which a subscriber can leave a message describing himself/herself and the type of partner required.

HEARTHBEAT/ACKNOWLEDGEMENT PROTOCOL

In certain client-server architectures, the client and server connectivity must be assured for an application to function correctly. In the present embodiment, the DMS 12 (database client) cannot update its records until it has received acknowledgement from an FS 10 (fax server) that a document has been faxed to a subscriber. In this case two separate handshaking protocols are generally used 1) heartbeat—whereby at configurable intervals a 'status' message is exchanged between the client and the server to check that they are both there, such a message is an unsolicited event; 2) acknowledgement—a message given in response to a given request before additional functions are performed—this is a solicited event. The acknowledgement message comprises status data on how the request was processed by the FS 10 such as whether it was fully processed or if there were any problems or errors. Such status data may be used by additional functions in deciding whether to bill the subscriber or resend the whole or part of the fax document. The two protocols are generally treated as separate procedures within the Client-Server system and therefore require separate though functionally similar control management code and callback processing. This can lead to additional overhead in the communication protocol and also to delays in recovery and unnecessary additional processing in both the client and the server.

Figure 7A:
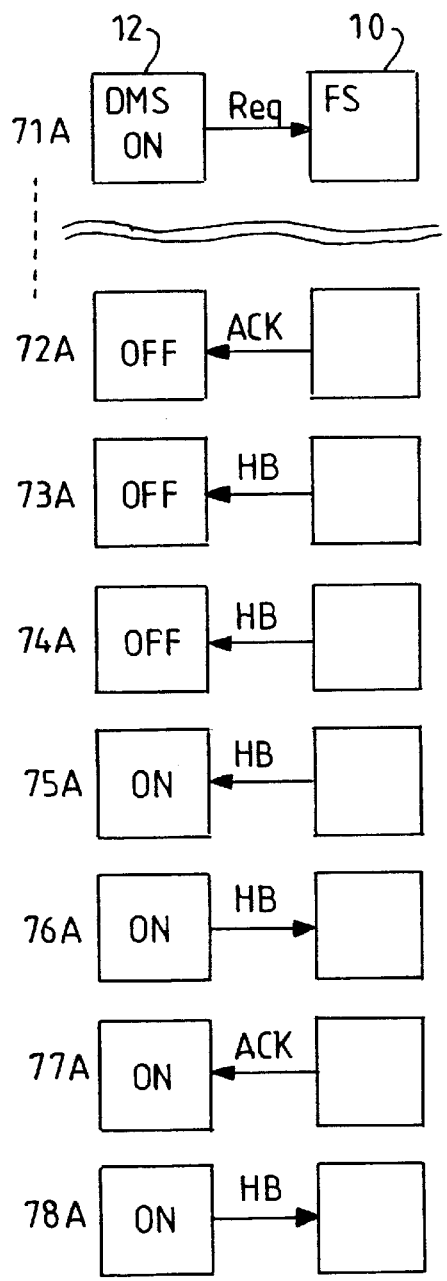
FIG. 7A shows the operation of a prior art communication protocol

FIG. 7A illustrates the operation of the prior art. The boxes on the left hand side represent the DMS12 and the boxes on the right represent the Fax Server 10 at sequential stages of sending a fax document to a subscriber and updating the subscribers account details. The FS is always online whereas the DMS 12 is online only in steps 71A and 75A to 78A, the DMS 12 is offline in steps 72A to 74A. At step 71A the DMS 12 sends a fax request to the FS 10. Between step 71A and 72A the DMS 12 goes offline because it is busy handling other requests or due to hardware problems—generally the DMS is only temporarily offline. The FS 10 sends an acknowledgement of the fax request in step 72A but receives no response. The FS 10 assumes that the DMS 12 is offline and sends regular heart beat signals in steps 73A to 75A. Between steps 74A and 75A the DMS 12 comes back online and in step 76A sends a heartbeat back to the FS 10. At this stage the FS 10 sends the original acknowledgement signal (step 77A) to the DMS 12 and receives a heartbeat by return (step 78A). In a bulk fax broadcast system the number of requests made and acknowledgement signals awaited can be large and an increase in the efficiency of the message protocol can improve the overall performance of the whole system.

According to a further aspect of the invention there is provided a method of ensuring communication integrity within a client server system, said client having an offline state and an online state, said method comprising:

said server sending a first signal to the client at regular intervals requesting that the client acknowledge;

said client, in an online state, receiving said first signal and sending an acknowledge response to the server;

said client, in an online state, sending a request to the server to perform a function;

the server receiving and processing said request;

said server, after processing the request, sending a second signal to the client, said second signal comprising information relating to the processed function;

when online the client receiving the second signal and storing the information;

said server continuing to send the second signal at regular intervals until a response is received from said client.

In the preferred embodiment of this aspect the first and second signals are combined as a single signal and sent together.

The first signal on its own relates to the heartbeat signal and the combined first and second signal relate to the acknowledgement signal in the description below.

Advantageously said method of ensuring data integrity is used for fax broadcast in a networked fax system in which said server is a fax server for transmitting fax documents to subscribers and said client stores fax document data.

According to another aspect of the invention there is provided a method of ensuring communication integrity within a client server system, said client having an offline state and an online state, said method comprising:

said server periodically sending a heartbeat request signal to the client until said client acknowledges;

said client, in an online state, receiving a heartbeat request signal and sending an acknowledge response to the server;

said server, on receipt of an acknowledge signal from the client, sending a data request signal to the client requesting that the client send particular data;

said client, in an online state receiving said data request signal and sending said requested data to the server, said server, receiving said data, processing the data and after processing periodically sending an acknowledgement signal to the client with status information about the processing of the data until said client acknowledges receipt.

Advantageously said method of ensuring data integrity is used for fax on demand in a networked fax system in which said server is a fax server, the processing is transmitting fax documents to subscribers and said client stores fax document data.

Figure 7B:
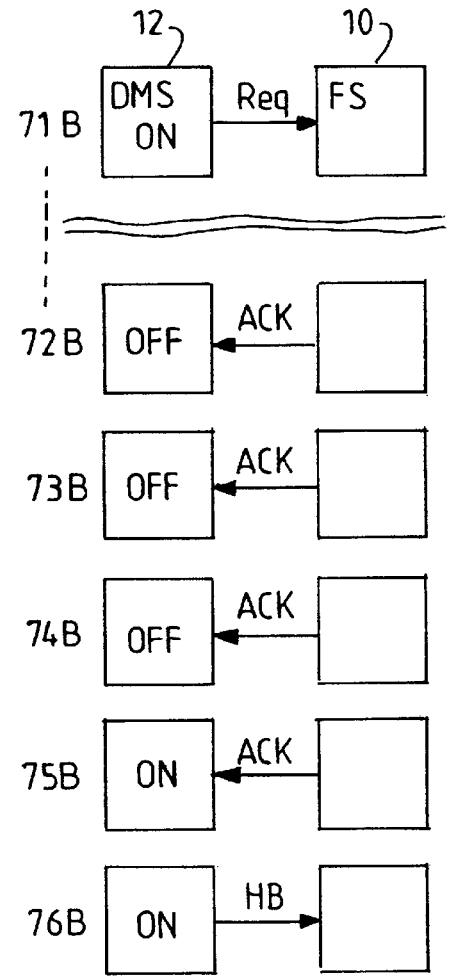
FIG. 7B shows the operation of a client/server communication protocol for fax broadcast.

FIG. 7B illustrates the operation of the fax broadcast embodiment having fewer steps than the process of FIG. 7A. As in the adjacent figure the boxes on the left represent the DMS 12 and the boxes on the right represent a FS 10. The DMS 12 is online at steps 71B, 75B and 76B and offline in steps 72B to 74B. The FS 10 is online in all steps. In step 71B the DMS 12 sends a fax request to the FS 10. After the fax request is sent the DMS and FS are in normal heartbeat mode whereby heart beats are exchanged by the FS and the DMS to check that they are both online. Between step 71B and 72B the DMS 12 goes offline. The FS 10 sends an acknowledgement of the fax request in step 62A but receives no response. At this step the DMS and FS are switched to heartbeat/acknowledgement mode where instead of sending regular heartbeat signals to establish the state of the DMS 12 as in the prior art, the FS 10 sends regular acknowledgement signals. In this way the acknowledgement signal performs the function of the heart beat signal in regularly testing to see if the DMS has come online and also its own function of conveying information to the DMS on how the status of the fax request. In step 75B the DMS, having come back online, receives the acknowledgement signal and sends a heartbeat signal back in step 76B. In this way the embodiment combines the acknowledgement signal and the heartbeat signal and saves the step of identifying that the DMS 12 is back online before sending the acknowledgement signal. At this step when there is no acknowledgement message pending the DMS and FS return to normal heartbeat mode. This method of using a heartbeat/acknowledgement mode where there is an acknowledgement message pending, reduces the number of acknowledgement message which are lost when the DMS is offline or otherwise unavailable.

Figure 8A:
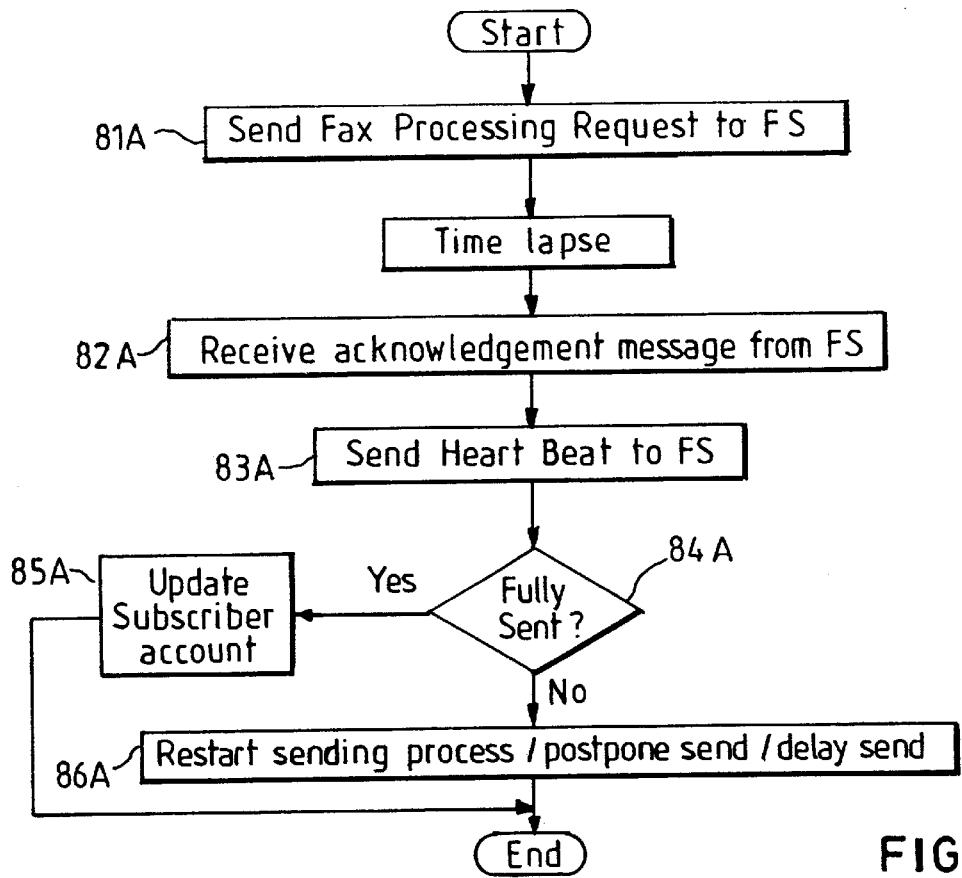
Figure 8B:
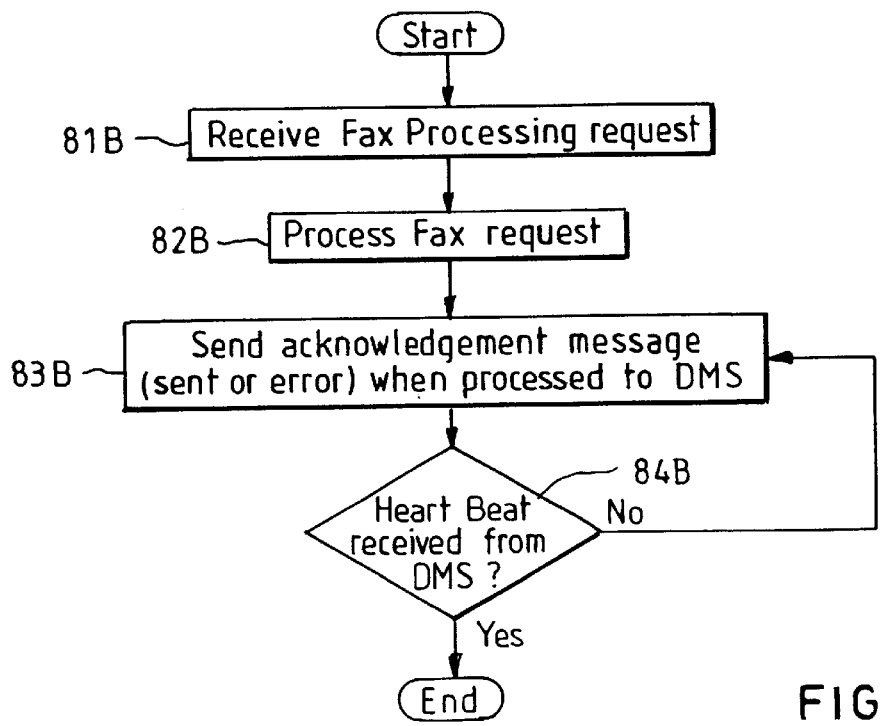
FIG. 8B shows the communication protocol steps performed by the server.

The basic processing steps performed in the DMS 12 and FS 10 achieve dual heartbeat/acknowledgement functionality are illustrated in FIGS. 8A and 8B respectively. The DMS 12 message protocol operates under the control of program code stored on the DMS. Initially the DMS sends a fax processing request to the FS 10 in step 81A. Step 82A an acknowledgement message is received from the FS 10 containing the status of the processing request. In between the sending of the request and receiving of the acknowledgment signal a period of time elapses, this may be due to the time for the fax processing to be undertaken and/or due to the DMS 12 being offline or not responding to the FS acknowledgement. Once the acknowledgement is received a heartbeat signal is sent (step 83A). In step 84A the DMS decides whether to bill the subscriber for the fax (step 85A) or to restart/postpone or delete the sending process 86A.

A corresponding program code stored on each FS 10 controls the FS 10 message protocol. A fax processing request is received at the FS10 (step 81B) from the DMS 12 and is passed to be processed (step 82B). Once processed the FS sends an acknowledgement message including the status data to the DMS (step 84B). The FS waits for a heart beat from the DMS to follow the acknowledgement message. If a heartbeat signal is received directly after the acknowledgement message is sent then the DMS can finish processing the fax request as it can assume that the DMS was online when the acknowledgement message was sent (step 84B). If no heartbeat message is received then the FS assumes that it must resend the acknowledgement message by returning to step 83B. The acknowledgement message is resent continuously until the DMS comes back online.

Figure 9:
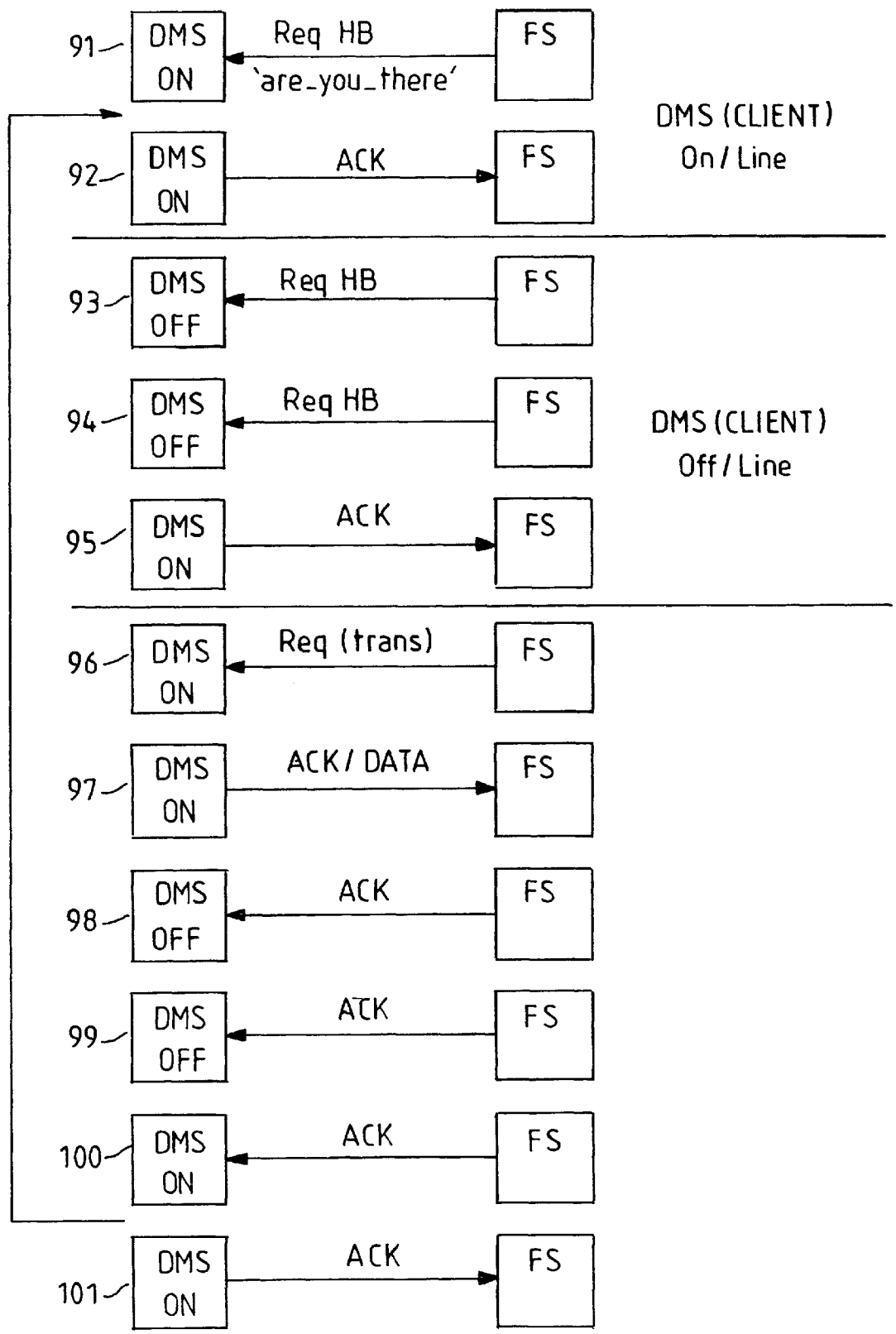
FIG. 9 shows the operation of the client/server communication protocol for fax-on-demand.

FIG. 9 illustrates the operation of the fax-on-demand embodiment of the method of ensuring data integrity. In a networked fax system in which said server is a fax server (FS) for transmitting fax documents to subscribers and said client (DMS) stores fax document data, the fax server wishes to transmit a document to a caller. In heartbeat mode the fax server sends a heart beat signal to the client 91. If the client is on-line it sends an acknowledgement signal back to the server 92. If the client is off-line no response is sent so that the server continues to periodically send the heart beat signal 93, 94 until the client responds with a acknowledgment signal 95. Now that the server knows that the client is on-line it requests a particular document from the client document database 97 and receives the document from the client 87. The server can now process the document by sending it to the client and such transmission may be successful, partially successful or unsuccessful. The status of the transmit is needed and expected by the client so that it may update the caller records and account. Once the transmit is completed the server does not check to see if the client is online by sending a heartbeat signal as in heartbeat mode. since the client in expecting a signal the server directly sends an acknowledgement signal to the client including information about the transmit 98 and the client should acknowledge. However if the client does not respond with an acknowledge signal then the server periodically sends the same acknowledgement signal 99 to the client until it does respond 100, 101 with an acknowledge. Therefore in this 'acknowledge' mode the step of checking to see if the client is online is eliminated.

In summary there is described a combined fax broadcast and fax-on-demand system having a plurality of facsimile enabled PC units connected to a server on a LAN network for storing the fax documents. Each PC unit comprises a fax card for performing telephony and fax functions on a plurality of channels connectable to respective telephone lines in a telephone network. Each one of said channels may be designated as an incoming or outgoing channel and the ratio of incoming and outgoing channels can be changed to reflect the number of fax broadcast documents scheduled for broadcast.

Now that the invention has been described by way of a preferred embodiment, various modifications and improvements will occur to those person skilled in the art. Therefore it should be understood that the preferred embodiment has been provided as an example and not as a limitation.

What is claimed is:

1. A fax broadcast and fax-on-demand system comprising:
   a central fax storage and control means:
   a plurality of fax servers, connected in a computer network to the central fax storage and control means, each fax server for performing telephony and fax functions on a plurality of fax channels connectable to telephone lines in a telephone network, each fax server having local storage means for storing documents and fax information, each fax server adapted to perform telephony and fax functions on each of their respective fax channels;
   configuration means for designating each fax channel as an incoming or outgoing fax channel by storing a record of said designation;
   broadcast means for associating a document and a subscriber fax number and further associating said document and number with a outgoing fax channel, and sending a copy of said document, fax number and a fax channel reference to the local storage means of the fax server having that fax channel; and fax-on-demand means for listening for calls on the incoming fax channels, answering a call from a subscriber, identifying the subscriber and the document required by the subscriber, associating said document and subscriber number with an outgoing fax channel, and sending said document, fax number and fax channel reference to the local storage means of the fax server having that fax channel, and initiating transmit of the document to the subscriber.

2. A fax broadcast and fax-on-demand system as claimed in claim 1 wherein said central fax storage and control means is adapted to store:
   a plurality of fax documents;
   a plurality of subscribers and associated fax numbers;
   a broadcast schedule associating certain documents for broadcast to certain subscribers for use by the broadcast means; and
   a fax channel configuration table identifying which fax channels are designated as incoming channels for fax-on-demand and outgoing channels for fax broadcast for use by the configuration means.

3. A system as claimed in claim 2 further comprising:
   means for copying a document and associated fax information from the main storage means to a local storage means of one of the fax means over the computer network.

4. A system as claimed in claim 3 wherein said means for copying uses Network File System protocol to copy the document from main storage means to local storage means.

5. A system as claimed in claim 2 whereby said main storage means is provided by a central computer attached to a network and each server means is provided by a server computer attached to the network.

6. A system as claimed in claim 5 further comprising:
   means for receiving a fax document from a subscriber on a incoming channel.

7. A system as claimed in claim 6 further comprising:
   means for receiving said fax document into local storage means; and
   means for copying said received fax document from local storage means to storage means when the document has been fully received.

8. A system as claimed in claim 7 further comprising:
   means for initiating broadcast of a demanded document on the same channel as the received call or on a new outgoing channel.

9. A system as claimed in claim 2 further comprising:
   means for monitoring the number of documents scheduled for broadcast in the broadcast schedule, wherein
   said configuration means designates the number of broadcast channels as a function of the number of broadcast documents scheduled.

10. A system as claimed in claim 8 wherein demand for fax broadcast is high, a higher proportion of outgoing channels is designated and when demand for broadcast is low, a lower proportion of output channels is designated.

11. A fax broadcast and fax-on-demand system having:
    a plurality of facsimile servers connected to a control unit each facsimile unit
    for performing telephony and fax functions on a plurality of channels connectable to telephone lines in a telephone network, each of said channels being configurable as an incoming or outgoing channel, each fax server having a local storage means for storing one or more documents prior to transmission on an outgoing channel or for storing one or more documents received on an incoming channel; said control unit comprising:
    main storage means for storing a plurality of facsimile documents, a plurality of subscriber names, and associated facsimile numbers, a broadcast schedule associating certain documents for broadcast to certain subscribers, and a channel configuration table identifying which channels are configured as incoming channels for fax-on-demand and outgoing channels for fax broadcast;
    configuration means for configuring the channels and for storing a record of said configuration in said channel configuration table;
    broadcast means for associating a document and a subscriber fax number from the broadcast schedule and further associating said document and number with an outgoing channel identified from the channel configuration table, and sending said document, fax number and a channel reference to the fax server having that channel;
    fax-on-demand means for receiving a call from a subscriber on an incoming channel, identifying the subscriber and the document required by the subscriber, and initiating broadcast of the document to the subscriber.

12. A system as claimed in claim 11 further comprising, for ensuring communication integrity between the fax server and the control unit where said control unit having an offline state and an online state:

each fax server further comprising means for sending a heartbeat signal to the control unit at regular intervals requesting that the control unit acknowledge;

said control unit further comprising means, in an online state, for receiving said heartbeat signal and sending an acknowledge to the sending fax server;

said fax server further comprising means for, sending a data request signal to the control unit requesting document data on receipt of an acknowledge signal from the control unit;

said control unit having means for, in an online state, receiving said data request signal card sending the document data to the fax server;

said fax server, further having means for, receiving said data, processing the data and periodically sending an acknowledgment signal to the client with status information about the processing of the data until said control unit acknowledges.

* * * * *